United States Patent [19]

Mercer

[11] Patent Number: 5,689,314
[45] Date of Patent: Nov. 18, 1997

[54] COMMON PATH POINT DIFFRACTION INTERFEROMETER USING LIQUID CRYSTAL PHASE SHIFTING

[75] Inventor: Carolyn R. Mercer, Cleveland, Ohio

[73] Assignee: The United States of America as represented by the Administrator of the National Aeronautics and Space Administration, Washington, D.C.

[21] Appl. No.: 490,250

[22] Filed: Jun. 14, 1995

[51] Int. Cl.⁶ .................. G02F 1/13; G01B 9/02; G01B 11/00
[52] U.S. Cl. .................. 349/1; 349/193; 349/201; 356/354; 356/363
[58] Field of Search .................. 349/1, 165, 193, 349/201; 356/354, 363, 328

[56] References Cited

U.S. PATENT DOCUMENTS

| | | | |
|---|---|---|---|
| 3,832,033 | 8/1974 | Furuhata et al. | 349/1 |
| 3,963,310 | 6/1976 | Giallorenzi et al. | 349/196 |
| 4,740,060 | 4/1988 | Komura et al. | 349/155 |
| 4,779,959 | 10/1988 | Saunders | 349/198 |
| 4,953,981 | 9/1990 | Hales | 356/353 |
| 5,142,395 | 8/1992 | Yamazaki et al. | 349/157 |
| 5,289,301 | 2/1994 | Brewer | 349/165 |
| 5,479,257 | 12/1995 | Hashimoto | 356/354 |
| 5,530,257 | 6/1996 | Mizutani et al. | 356/354 |

OTHER PUBLICATIONS

NASA technical Memorandum 106687—Defocus Measurement Using a Liquid Crystal Point Diffraction Interferometer, Mercer et al, Aug. 1994.

Primary Examiner—Anita Pellman Gross
Attorney, Agent, or Firm—Vernon Williams; Kent N. Stone

[57] ABSTRACT

A common path point diffraction interferometer uses dyed, parallel nematic liquid crystals which surround an optically transparent microsphere. Coherent, collimated and polarized light is focused on the microsphere at a diameter larger than that of the microsphere. A portion of the focused light passes through the microsphere to form a spherical wavefront reference beam and the rest of the light is attenuated by the dyed liquid crystals to form an object beam. The two beams form an interferogram which is imaged by a lens onto an electronic array sensor and into a computer which determines the wavefront of the object beam. The computer phase shifts the interferogram by stepping up an AC voltage applied across the liquid crystals without affecting the reference beam.

16 Claims, 3 Drawing Sheets

COMMON PATH POINT DIFFRACTION INTERFEROMETER USING LIQUID CRYSTAL PHASE SHIFTING

ORIGIN OF THE INVENTION

The invention described herein was made by an employee of the United States Government and may be manufactured and used by or for the Government for Government purposes without the payment of any royalties thereon or therefor.

BACKGROUND OF THE INVENTION

1. Field of the Invention

This invention relates to liquid crystals surrounding a transparent sphere and the use thereof in phase shifting interferometer to measure optical wavefronts. More particularly, the invention relates to a common path point diffraction interferometer for measuring optical wavefronts using voltage biased liquid crystals surrounding a transparent sphere to simultaneously produce an object and a reference beam and to shift the phase of the object beam, without affecting the reference beam.

2. Background of the Disclosure

The point diffraction interferometer is well known to those skilled in the art and is used for the measurement of optical wavefronts and lens testing. More recently it's use has been extended to fluid flow diagnostics and in microgravity studies aboard the space shuttle. Kwon developed a multichannel, common path, phase shifted, point diffraction interferometer using a diffraction grating to simultaneously produce three phase shifted interferograms (O. Y. Kwon, "Multichannel phase shifted interferometer", Opt. Lett. 9(2), 59–61(1984)). However, this device is limited to only three fixed phase shifts. Voltage biased liquid crystals have been used in interferometers to modulate and phase shift incident light radiation as disclosed in U.S. Pat. Nos. 3,832,033 and 4,779,959. Kadono et. al. used a liquid crystal cell to modulate or phase shift the incident beam in a common path, point diffraction, shearing interferometer (H. Kadono, et. al. "Speckle-shearing interferometry using a liquid-crystal cell as a phase modulator", J. Opt. Soc. Am. A., 8(12), 2001–2008 (1991)) and, more recently, etched opposing, 100 micron holes in the substrate electrodes of the liquid crystal phase shifter to make a point diffraction common path interferometer which simultaneously produces a reference beam and phase shifts the object beam (H. Kadono, et. al., "Phase shifting common path interferometer using a liquid crystal phase modulator", Opt. Comm. 110, 391–400 (1994)). The incident light must be focused on the cell at a diameter in excess of 100 microns so that a portion of the light passes through the liquid crystals whose orientation will be altered by the electrical field. This large focal point isn't useful for measuring optics of high quality or for making very sensitive measurements. Also, some of the applied electric field enters the liquid crystals within the hole, which further reduces the interferometer's sensitivity. Ferroelectric liquid crystal displays and panels have been made incorporating round beads made of a hard material such as alumina, silica, hard plastic and the like and which need not be transparent, to maintain a constant distance between the pair of substrate boundaries of the device (e.g., U.S. Pat. Nos. 4,740,060 and 5,142,395). However, such displays and panels have not been used as modulators in interferometers.

SUMMARY OF THE INVENTION

It has now been discovered that birefringent liquid crystals surrounding a transparent sphere can be used in an interferometer to simultaneously generate a local reference beam and an object beam and to phase-shift the object beam without affecting the reference beam. The incident light beam is coherent, polarized and is brought to a focus near the sphere. The focused spot is larger than the sphere, so that the sphere acts as a pinhole and a spherical wave is generated by diffraction as the reference beam. The rest of the incident light travels through the liquid crystals and transmitted as the object beam. Information contained in the incident wave is retained in the object beam, but filtered out of the diffracted wave or reference beam. The liquid crystals are birefringent and applying an AC bias voltage across the liquid crystal molecules alters their orientation and consequently their refractive index. This shifts the phase of the emitted object beam, but not that of the reference beam. As the amplitude of the voltage is changed, the phase of the object beam is changed, but not that of the reference beam. The object and reference beams travel coincidentally and combine coherently to form an interferogram which is digitized and stored in a computer. A sequence of phase-stepped interferograms are stored in the computer which compares the pixels in the interferograms, frame by frame and computes the phase difference between the wave fronts. Aberrations in the incident wave are indicated in the interferogram. The sphere is a transparent microsphere and, since it acts as a pinhole or a point, the invention relates to a liquid crystal point diffraction interferometer. By microsphere is meant a sphere having a diameter which may broadly range from ½ to 500 microns, more generally between 4 to 200 microns and preferably between about 5 to about 10 microns. In the context of the invention, by transparent is meant transparent at least to the wavelength of the incident light. By "liquid crystals" is meant birefringent liquid crystals which is what the term means in its ordinary sense. It is important in the practice of the invention that there not be a substantial layer of liquid crystal between the microsphere and both the incident light and the emitted reference beam. This is accomplished by sandwiching the liquid crystal layer and microsphere between two rigid, transparent substrates, such as glass. Thus, the term "surrounded by a liquid crystal layer" is meant to exclude a substantial layer of liquid crystal between the microsphere and both the incident light and the emitted reference beam.

In one embodiment the invention relates to a liquid crystal cell comprising a liquid crystal layer of uniaxial crystals surrounding a transparent sphere, wherein both the crystal layer and sphere are bounded on opposite sides by a pair of transparent, opposing substrates and a pair of transparent electrodes and wherein the diameter of the sphere is the same size as, or slightly larger than, the distance between the substrates. Again, by transparent is meant transparent to at least the incident wavelength. In another embodiment the invention relates to a common path, point diffraction interferometer comprising the liquid crystal cell, to simultaneously generate a reference beam and an object beam and to phase shift the object beam without affecting the reference beam. In a preferred embodiment, a layer of uniaxial liquid crystals are sandwiched between two glass plates on each of which is a transparent electrode. The uniaxial liquid crystals are aligned or oriented parallel to each other. This orientation is readily accomplished by rubbing either the electrodes or glass plates, whichever are in contact with the liquid crystal layer, to form parallel microgrooves therein in the desired direction of alignment. Dispersed in the liquid crystal layer are microspheres made of plastic or glass which displace the liquid crystal material so that a layer of liquid crystal is not interposed between the microsphere and both the incident beam and the reference beam. The glass plates are spaced apart by suitable means such as glass rods having the same or slightly smaller diameter as the microspheres. Coherent light is collimated and passed through a polarizer. The polarized light is focused over a sphere in the liquid crystal cell, with the focal diameter larger than the diameter of the microsphere, and with the plane of the polarized incident light parallel to the orientation plane of the liquid crystals in the liquid crystal layer when the liquid crystals are in a relaxed state. Part of the light travels through the microsphere forming a reference beam and the remainder travels through the liquid crystal layer, being transmitted as the object beam. Applying an AC bias voltage across the electrodes alters the crystal orientation in the liquid crystal layer, thereby phase-shifting the object beam. Thus, in another embodiment the invention relates to a common path, point diffraction method of forming an interferogram which comprises focusing a coherent, polarized incident light beam over a microsphere surrounded by the liquid crystal layer wherein the diameter of the microsphere is the same as the thickness of the layer, to simultaneously produce an object beam and a spherical wave reference beam, wherein the object and reference beams are coherent and produce an interferogram which is phase-shifted, digitized and computed as set forth above.

The common path, point diffraction liquid crystal interferometer of the invention is compact, simple to align, environmentally insensitive and capable of accurately measuring optical wavefronts with a very high data density and with automated data reduction.

DETAILED DESCRIPTION

Figure 1A:
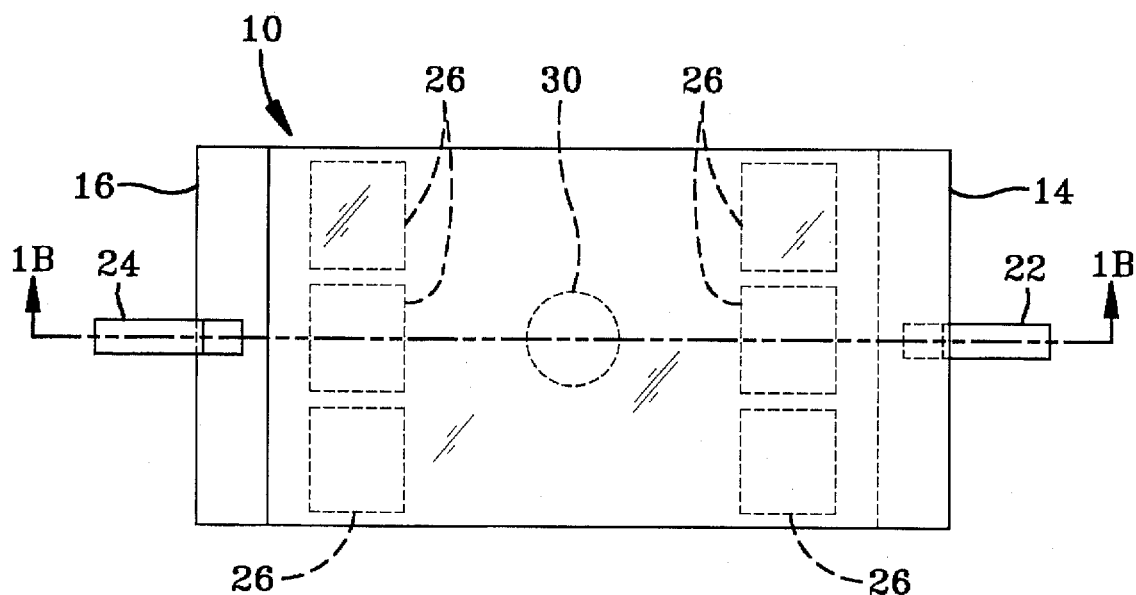
FIGS. 1(a) and 1(b) schematically illustrate a top view and a side view, respectively, of a liquid crystal cell useful in the practice of the invention.
Figure 1B:
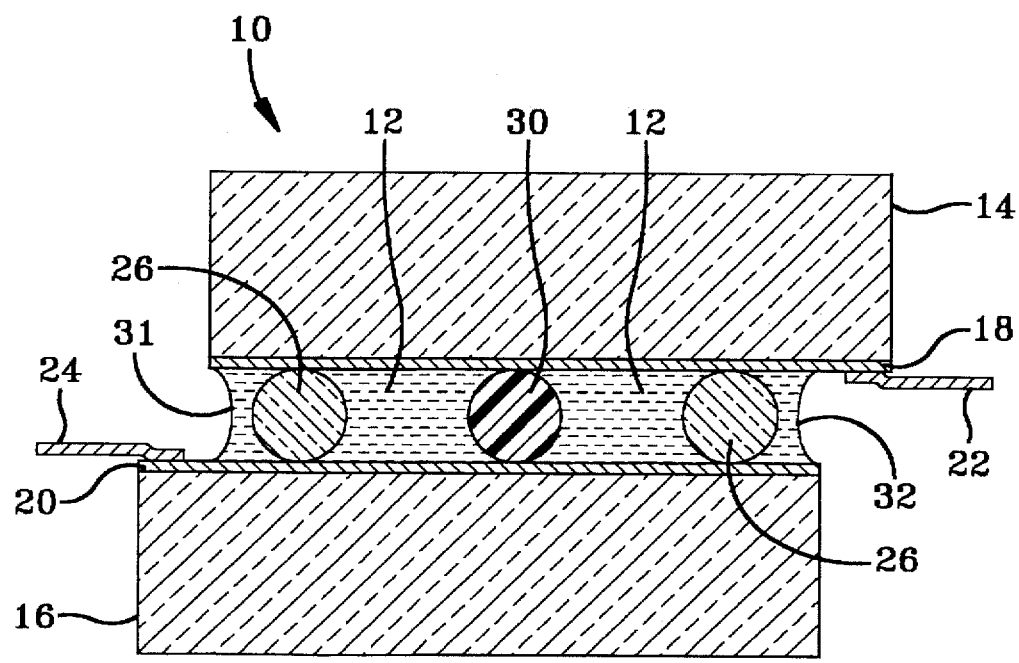

Referring to FIGS. 1(a) and 1(b), a liquid crystal cell of the invention 10 is schematically shown as a layer of nematic liquid crystals 12 disposed or sandwiched between two parallel and opposing glass plates 14 and 16, with transparent electrodes 18 and 20 disposed adjacent the inner surface of each respective electrode. Transparent electrodes 18 and 20 are formed by depositing a layer of, for example, tin oxide doped with indium onto the surface of the glass plates by any suitable means such as chemical or physical deposition (i.e., sputtering), as is well known to those skilled in the art. The thinner the glass plates are, the better the results will be. Metal leads 22 and 24 are electrically connected to respective electrodes 18 and 20 by soldering or by an electrically conductive adhesive. Miniature cylindrical glass rods 26 are placed at the edges to serve as spacers to maintain the desired distance between the plates. Although only one microsphere is shown in the Figure for the sake of convenience, when assembling cell 10, several transparent plastic microspheres 30, all of the same diameter and made of any suitable transparent material, such as plastic or glass, and having a diameter equal to or slightly larger than the diameter of the rods, may be scattered throughout the liquid crystal layer. It is important that the spheres not dissolve in, react with or otherwise adversely affect the liquid crystal layer. A layer of uniaxial nematic liquid crystals, such as Merk E-7 oriented parallel with each other in the relaxed state is used, although anti-parallel nematic or twisted nematic liquid crystals may also be used. It is preferred that the crystals be oriented parallel to each other. Parallel orientation of the liquid crystals is readily achieved by forming parallel microgrooves in the surface of the electrodes along the plane of the glass by rubbing. This causes the uniaxial, nematic liquid crystals to be oriented or aligned with their long axis oriented parallel to the plane of the glass plates and to each other in the relaxed state. By relaxed state is meant with no voltage applied across the liquid crystal layer. This orientation permits phase modulation of incident light polarized in a plane parallel to the axial orientation of the liquid crystals.

As shown in FIG. 1(b) which is a side view of cell 10 taken through the middle as shown, opposite sides of the microsphere contact the inner surfaces of the respective glass plates so that no liquid crystal layer is present at the point of contact and there is concomitantly substantially no liquid crystal layer above or below the microsphere. The liquid crystal layer is very thin, being equal to the distance between the plates, and is held within the pair of plates at the edges by surface tension as indicated by a meniscus 32. If desired, the cell can be sealed by any convenient means, such as an elastomeric silicone seal and the like. Further, if desired or if necessary, dye is added to the liquid crystal layer in order to attenuate the object beam to approximately the same intensity as the reference beam. This improves the fringe contrast in the interferograms, but will also cause an intensity modulation when the phase is shifted if the dye molecules have a dipole moment and rotate with the liquid crystal molecules when a voltage is applied across the cell. Also, if a dye is used, it is convenient if it has an absorptance which, when added to the liquid crystal layer, will result in the amplitude of the object and reference waves or beams being nominally equal (e.g., ±10% for a given F-number of the focusing lens). It will be appreciated that the invention has many advantages over the prior art. It provides full-field wavefrom measurements using phase shitting interferometry and a common path design employing few optical elements. Any number of arbitrary phase angles are obtainable. The refractive index distribution of transparent objects is measured directly. Both the alignment and manufacturing procedures are simple.

Figure 2:
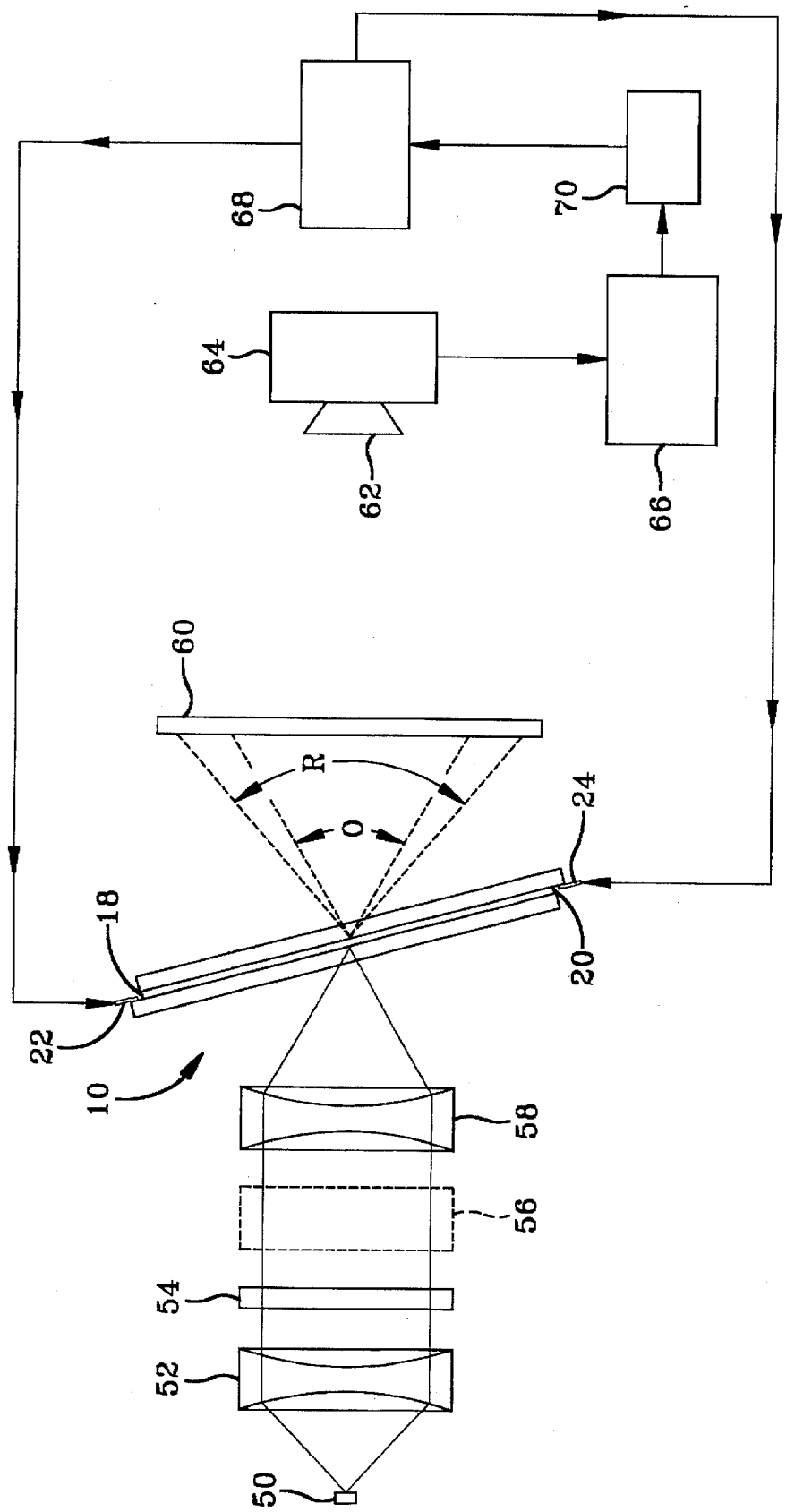
FIG. 2 schematically illustrates an optical system used in conjunction with the cell of FIG. 1 and an associated electronic system for receiving, digitizing and automatically phase shifting the interferograms, and calculating the wavefronts of the interferograms.

Referring to FIG. 2, a point source of laser light 50 is collimated by a collimating lens 52, with the collimated light then passing through a linear polarizer 54 which aligns the electric field of the light in a direction parallel with the alignment of the long axis of the liquid crystals in liquid crystal cell 10. If a flow is to be measured in a test cell, or if an arbitrary phase object is to be measured, both illustrated in phantom as 56, a second high quality lens 58 focuses the beam on the cell 10 and the flow in the test chamber 56 or otherwise is directed across the optical path between the two lenses 52 and 58. If a lens is to be tested, then the test lens will be lens 58 which focuses the light beam on cell 10. The position of cell 10 is adjusted so that a microsphere surrounded only by the liquid crystals is within the center of the focus spot. The incident light beam is focused on the microsphere in cell 10 at a diameter larger (e.g., two to five times larger) than that of the microsphere. Cell 10 is tilted about 20 degrees as shown to reduce interference effects caused by multiple reflections. This tilt is not necessary if cell 10 is coated with an anti-reflection coating.

As set forth above, the microsphere acts as a pinhole and a spherical wave is generated by diffraction as the reference beam. The rest of the incident light travels through the liquid crystals and is transmitted as the object beam. Information contained in the incident light is retained in the object beam, but filtered out of the diffracted reference beam. The liquid crystals are birefringent. Applying an AC bias voltage across the liquid crystal layer alters the molecular orientation and consequently the refractive index of the layer. This shifts the phase of the emitted object beam, but not that of the reference beam. As the amplitude of the voltage is changed, the phase of the object beam is changed, but not that of the reference beam. The birefringent liquid crystals are uniaxial. Light polarized parallel to the linear axis or director of the liquid crystal molecules sees the extraordinary refractive index of the liquid crystal. Therefore, for incident light polarized parallel to the microgrooves in cell 10, the refractive index of the liquid crystal layer will be the extraordinary refractive index when the applied electric field strength is below a threshold value. As the amplitude of the applied voltage increases to the saturation voltage, the molecules will realign themselves until they are perpendicular to the glass plates, at which point the refractive index of the liquid crystals will be the ordinary refractive index. The refractive index of the liquid crystals will vary monotonically between the two extremes at each intermediate electric field amplitude. This refractive index modulation shifts the optical phase of the light passing through the liquid crystal. Cell 10 itself introduces aberrations which must be subtracted from the measured wavefront. This correction will occur automatically if the device is used to measure an initial wavefront subtracted from the altered wavefront such as is in the case in fluid studies. An AC voltage is created by a sine wave generator 68 and applied across electrodes 18 and 20 of cell 10 as shown in FIG. 2. This realigns the liquid crystals, thereby changing their refractive index. Computer 66 sends out a digital signal which is converted to a DC voltage by a digital/analog converter 70. This DC voltage modulates the amplitude of the sine wave. As the amplitude of the applied AC voltage is varied, the orientation of the liquid crystal varies which causes the refractive index of the liquid crystal to change as set forth above. This in turn varies the optical phase of the object beam, O. The phase is shifted by ramping the amplitude, or stepped by changing the amplitude in discrete steps. The phase of the spherical wavefront or reference beam, R, does not vary.

The object, O, and reference, R, beams travel coincidentally and combine coherently to form an interferogram which is digitized and stored in a computer. The phase of the object beam is then stepped by increasing the amplitude of the AC voltage applied across the liquid crystal layer, and the subsequent phase-shifted interferogram is also digitized and stored in the computer. This sequence is repeated until the desired number of phase shifted interferograms are stored, each with the appropriate amount of phase shift between the object and reference beams. Typically four or five interferograms are captured, with a $\pi/2$ radian phase shift between each interferogram. The stored interferograms are then processed by the computer by comparing corresponding pixels in each frame and computing the phase difference between the object and reference waves. This phase difference is a direct indicator of the aberrations contained in the object wave. The interferograms are displayed, if desired, on a diffusing screen 60, but the use of a display screen is not necessary. The interferograms are imaged by a lens 62 onto an electronic array sensor 64 in which they are digitized and stored on a computer 66 where standard phase-shifting interferometry techniques are used to determine the wavefront of the object beam, O. If a flow is being measured, the wave front through the flow is measured once and then again after the flow propagates. The two wavefront measurements are subtracted to measure the differences in the flow properties.

The invention will be further understood by reference to the example below.

Example

In this example a liquid crystal cell as shown in FIG. 1 was used, as shown in FIG. 2, as a common path, point diffraction interferometer with liquid crystal phase shifting. A point source of laser light having a wavelength of 514.5 nanometers was generated by an Argon ion laser operated without an etalon, without a prism, and without a constant intensity feedback mechanism. The multiline output intensity was nominally 120 mW. Two external prisms and a beam stop were used to select the 514 nanometer line, and beam steering mirrors brought the light up to the desired height. This light was passed through an objective lens and pinhole to achieve a point source and then collimated by a Cooke triplet having a 100 mm focal length. The collimated light was then passed through a linear polarizer and focused onto a microsphere in the liquid crystal cell as shown in FIG. 2 by a second Cooke triplet lens having a 100 mm focal length. The collimating optics produced a 25 mm diameter collimated beam with a power density of nominally 1.5 mW/cm$^2$, or 6.8 mW total power. Uncoated (no anti-reflection coating) glass plates were used and so the cell was tilted by about 20 degrees to reduce interference effects caused by multiple reflections. The focused spot size was estimated as being about 25 microns in diameter. The light was horizontally polarized and the liquid crystal cell was oriented with the relaxed liquid crystal molecules oriented horizontally in a plane parallel with the polarized light and just behind the focused spot. A layer of parallel and uniaxial nematic liquid crystal (Merk E-7) 9 microns thick was used to which had been added a dye having an optical density of about 2 at the incident light wavelength in order to attenuate the object beam to about the same intensity as the reference beam. The liquid crystal cell was as shown in FIG. 1 and parallel microgrooves were formed in the transparent electrodes by rubbing to horizontally align the liquid crystals. Glass rods 9 microns in diameter were used a spacers as shown in FIG. 1 and plastic spheres having a diameter of 9 microns were distributed in the liquid crystal layer, which filled up the space between the glass plates. The glass plates were each nominally 0.5 mm thick and 3.0×3.5 cm across.

A ground glass screen was placed 21 cm behind the liquid crystal cell and a 50 mm Nikkor lens at f/5.8 imaged the interferogram onto a CCD detector array consisting of 768×493 active pixels, each 11.38×13.50 microns. Images from the camera were digitized into a personal computer by a frame grabber. A computer controlled programmable function generator was used to generate the AC voltage for phase stepping.

A fluid test chamber made with clear plastic walls was positioned between the two collimating lenses. Double walls were used to reduce heat losses from the sides. Circular fused silica windows were inserted in the center of two opposing walls to provide a high quality viewing port. The windows were 30 mm in diameter, 6 mm thick, and polished to a one-tenth wave finish. K-type thermocouples connected to an electronic readout having a resolution of 0.1° C. were used to monitor the temperature of the top and bottom surfaces inside the chamber. The chamber was filled with silicon oil having a refractive index of 1.4022 at 25° C. The chamber was positioned between the two collimating lenses as shown in phantom in FIG. 2. The optical path length through the oil chamber was 43 mm. A 16 mm diameter aperture behind the last window sharply truncated the beam traveling to the second collimating lens to 16 mm In order to measure the temperature distribution across the central portion of the test chamber, two wavefronts were measured. First, five phase-stepped interferograms were recorded to measure the wavefront passing the chamber with the test fluid at room temperature (isothermal condition). The difference between the ordinary and the extraordinary refractive indices of the liquid crystals is 0.22. Five π/2 radian phase steps were accomplished by applying an voltage sequence ranging from 1.04 to 1.55 VAC across the electrodes. The intensity distribution of the object beam alone was measured by horizontally translating the liquid crystal cell 0.75 mm along axis of the incident beam so that the focused beam did not pass through any microspheres. The oil was heated anisotropically, then five more phase-stepped interferograms were recorded to measure the wavefront passing through the heated oil. The difference between these measured wavefronts was then used to determine the temperature distribution across the oil. The oil temperature distribution along a single line near the center of the chamber was also measured with a K-type thermocouple. Temperature readings were taken every millimeter within the window area and every 5 millimeters elsewhere. The measurements had an accuracy of 0.1° C.

Standard phase-extraction algorithms such as the Hariharan algorithm assume that the average intensity and the fringe contrast remain constant from frame to frame so that a closed-form solution for the wavefront exists. This assumption isn't true for the case where a dye is added to the liquid crystal layer, because neither the average intensity nor the contrast is constant as a result of dye-induced object beam intensity variations. However, this variation is easily determined by passing the focused beam through the liquid crystal cell far from the microsphere and imaging the transmitted light. This information can be used to normalize the interferograms.

Figure 3:
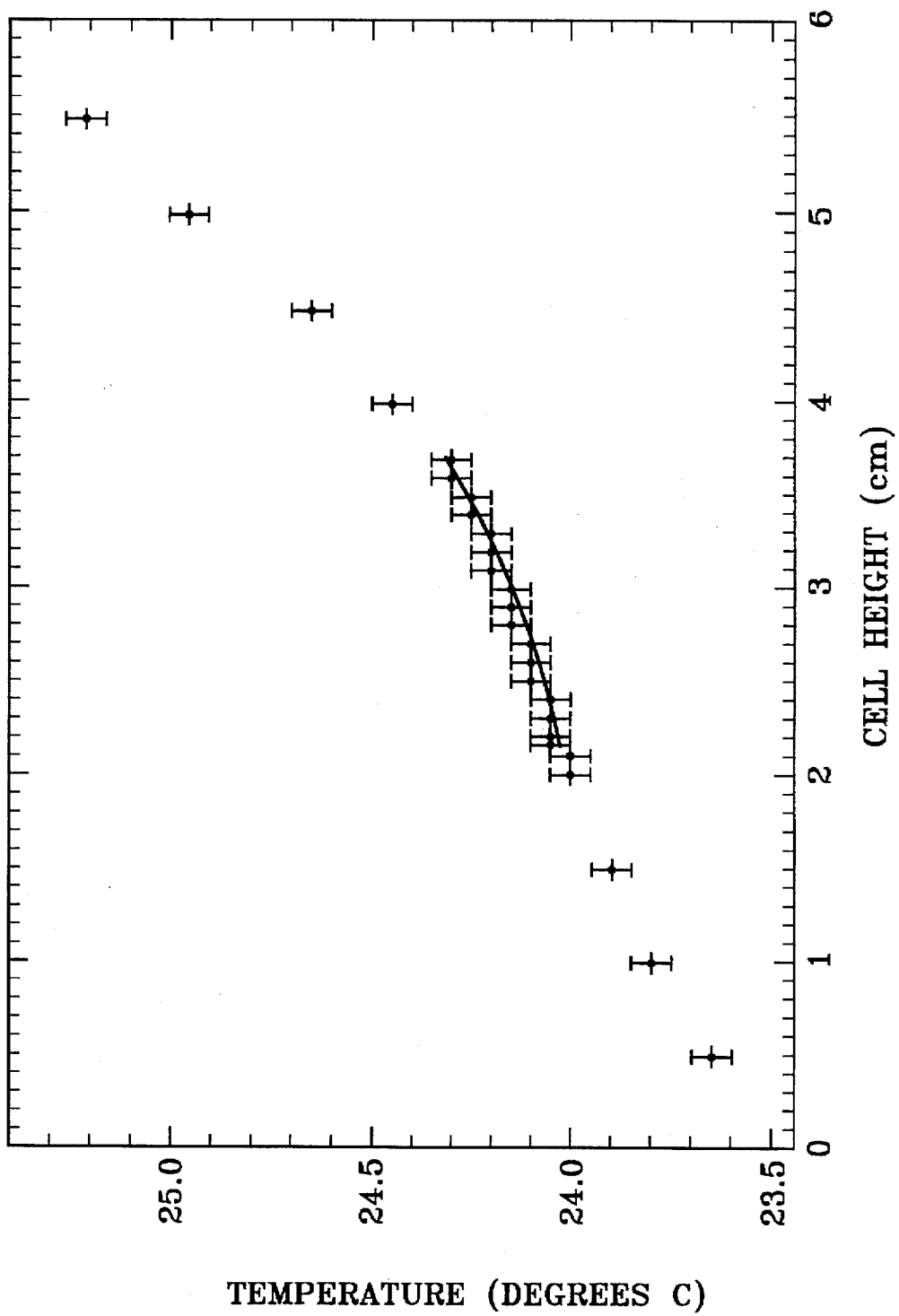
FIG. 3 is a graph illustrating the accuracy of the interferometer of the invention for measuring the temperature distribution of an oil bath wherein the interferometer results are shown as a solid line superimposed over thermocouple data (crossed bars).

The data shown in FIG. 3, in which the thermocouple measurements as a function of cell height position in the chamber are indicated by the error bars and the interferometer measurements are superimposed over the center thermocouple measurements as a solid line, indicate excellent agreement between the interferometer measurements and the thermocouple measurements to within the 0.1° C. resolution of the thermocouple data. The non-linear temperature distribution across the chamber is typical of what has been observed in similar fluid chambers in previous experiments.

It is understood that various other embodiments and modifications in the practice of the invention will be apparent to, and can readily be made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A common path, point diffraction interferometer for forming interferograms from simultaneously produced object and reference beams derived from a single incident light beam which comprises a liquid crystal cell having a pair of transparent, parallel and opposing substrates and enclosing within a liquid crystal layer containing at least one microsphere whose diameter is equal to the distance between said substrates, each said substrate having a transparent electrode adjacent an opposing surface.

2. An interferometer according to claim 1 wherein said liquid crystal layer comprises uniaxial nematic liquid crystals.

3. An interferometer according to claim 2 wherein said uniaxial nematic liquid crystals are oriented in a direction parallel to each other along a common axis.

4. An interferometer according to claim 3 wherein said liquid crystal layer contains a dye.

5. An interferometer according to claim 4 wherein said dye has an optical density sufficient to attenuate said object beam to the same intensity as said reference beam.

6. An interferometer according to claim 5 wherein said liquid crystals are oriented in a direction parallel to the plane of said substrates.

7. A method for forming an interferogram which comprises focusing a coherent, polarized incident light beam proximate a transparent microsphere surrounded by a layer of liquid crystal so that a portion of said incident light is diffracted by said microsphere to form a reference beam, with the remainder of said incident light traveling through said liquid crystal layer to form an object beam simultaneously with said reference beam and wherein said object and reference beams are coherent and produce said interferogram.

8. A method according to claim 7 wherein said interferogram is phase-shifted by applying a voltage across said liquid crystal layer.

9. A method according to claim 8 wherein said phase shifting shifts the phase of said object beam and does not affect said reference beam.

10. A method according to claim 9 wherein said microsphere is in the center of said focus and wherein the diameter of said focus is greater than the diameter of said microsphere to insure that a portion of said incident light travels through said liquid crystal layer.

11. A method according to claim 10 wherein said liquid crystal layer comprises uniaxial, nematic liquid crystals.

12. A method according to claim 11 wherein said nematic liquid crystals are oriented parallel to each other.

13. A method according to claim 12 wherein the plane of said polarized light is parallel to the plane of orientation of said nematic liquid crystals.

14. A method according to claim 13 wherein said liquid crystal contains a dye to attenuate the intensity of said object beam.

15. A method according to claim 11 wherein said liquid crystal contains a dye to attenuate the intensity of said object beam.

16. A method for forming an interferogram which comprises focusing a coherent, polarized incident light beam proximate a transparent microsphere surrounded by a layer of uniaxial nematic liquid crystal so that a portion of said incident light is diffracted by said microsphere to form a reference beam, with the remainder of said incident light traveling through said liquid crystal layer to form an object beam simultaneously with said reference beam, wherein said object and reference beams are coherent and produce an interferogram which is phase shifted by applying an AC voltage across said liquid crystal layer to phase-shift said object beam, but not said reference beam, wherein said nematic liquid crystals are oriented parallel to each other and the plane of said polarized incident light is parallel to the orientation plane of said nematic liquid crystals in their relaxed state, and wherein said crystal layer contains a dye to attenuate the intensity of said object beam.

* * * * *